US010612705B2

(12) United States Patent
Prevot et al.

(10) Patent No.: US 10,612,705 B2
(45) Date of Patent: Apr. 7, 2020

(54) CLAMPING DEVICE COMPRISING A CLAMPING COLLAR AND A SLEEVE

(71) Applicant: ETABLISSEMENTS CAILLAU, Issy les Moulineaux (FR)

(72) Inventors: Fabrice Prevot, Selles sur Cher (FR); Nicolas Rigollet, Romorantin (FR)

(73) Assignee: Etablissements Caillau, Selles sur Cher (FR)

( * ) Notice: Subject to any disclaimer, the term of this patent is extended or adjusted under 35 U.S.C. 154(b) by 135 days.

(21) Appl. No.: 15/483,102

(22) Filed: Apr. 10, 2017

(65) Prior Publication Data

US 2017/0292643 A1 Oct. 12, 2017

(30) Foreign Application Priority Data

Apr. 12, 2016 (FR) ..................................... 16 53222

(51) Int. Cl.
*F16L 23/08* (2006.01)
*F16L 59/18* (2006.01)

(52) U.S. Cl.
CPC ............. *F16L 23/08* (2013.01); *F16L 59/184* (2013.01)

(58) Field of Classification Search
CPC ......... F16L 23/08; F16L 23/003; F16L 23/04; F16L 21/06; F16L 21/065
USPC .................................................... 285/23, 410
See application file for complete search history.

(56) References Cited

U.S. PATENT DOCUMENTS

| | | | | |
|---|---|---|---|---|
| 4,473,246 A * | 9/1984 | McDowell | ............ | F16L 21/065 285/330 |
| 6,832,786 B2 * | 12/2004 | Duncan | ................. | F16L 21/002 285/109 |
| 2015/0115605 A1 * | 4/2015 | Gramza | .................. | F16L 21/06 285/410 |
| 2015/0226368 A1 | 8/2015 | Schellin et al. | | |
| 2017/0254454 A1 * | 9/2017 | Vosgeois | ................ | F16L 23/08 |

FOREIGN PATENT DOCUMENTS

| | | | |
|---|---|---|---|
| DE | 202010016759 U1 * | 2/2011 | ................ F16L 5/04 |
| EP | 1 451 498 B1 | 3/2006 | |
| EP | 2 598 785 B1 | 9/2015 | |
| FR | 3 008 160 A1 | 1/2015 | |
| FR | 3050232 A3 * | 10/2017 | ............. F01N 13/14 |
| JP | 2015111003 A * | 6/2015 | ............ F16L 21/065 |
| WO | WO 2009/131607 A2 | 10/2009 | |

* cited by examiner

*Primary Examiner* — David Bochna
(74) *Attorney, Agent, or Firm* — Fay Sharpe LLP; James E. Scarbrough

(57) ABSTRACT

The device comprises a clamping collar (10) having a belt (12) suitable for being tightened around an article, and an outer sleeve (16) disposed around the belt, the sleeve being carried by the belt by means of a plurality of fastener tabs (18). Each fastener tab (18) is fastened to the sleeve (16) by a fastening zone (18A) and extends towards the axis (A) of the collar from said fastening zone until it reaches a pinch branch (18B) that is folded back under the belt in a configuration for being pinched between the inside surface of the belt and the article around which the belt is to be tightened.

18 Claims, 4 Drawing Sheets

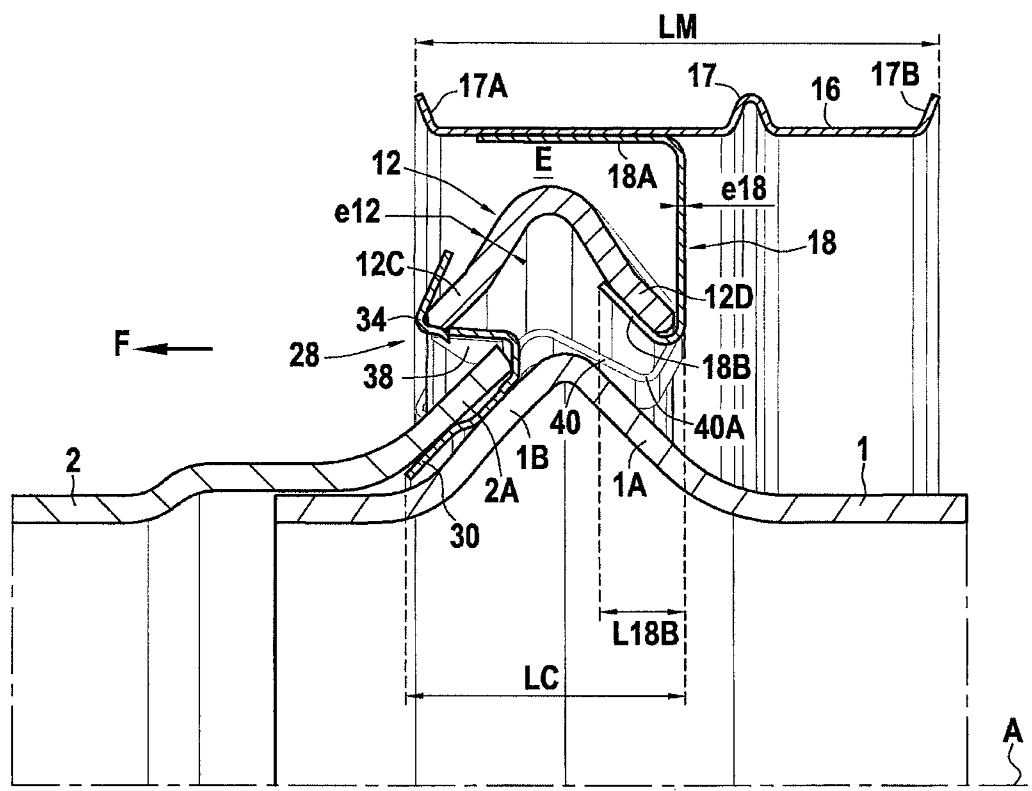
FIG.3
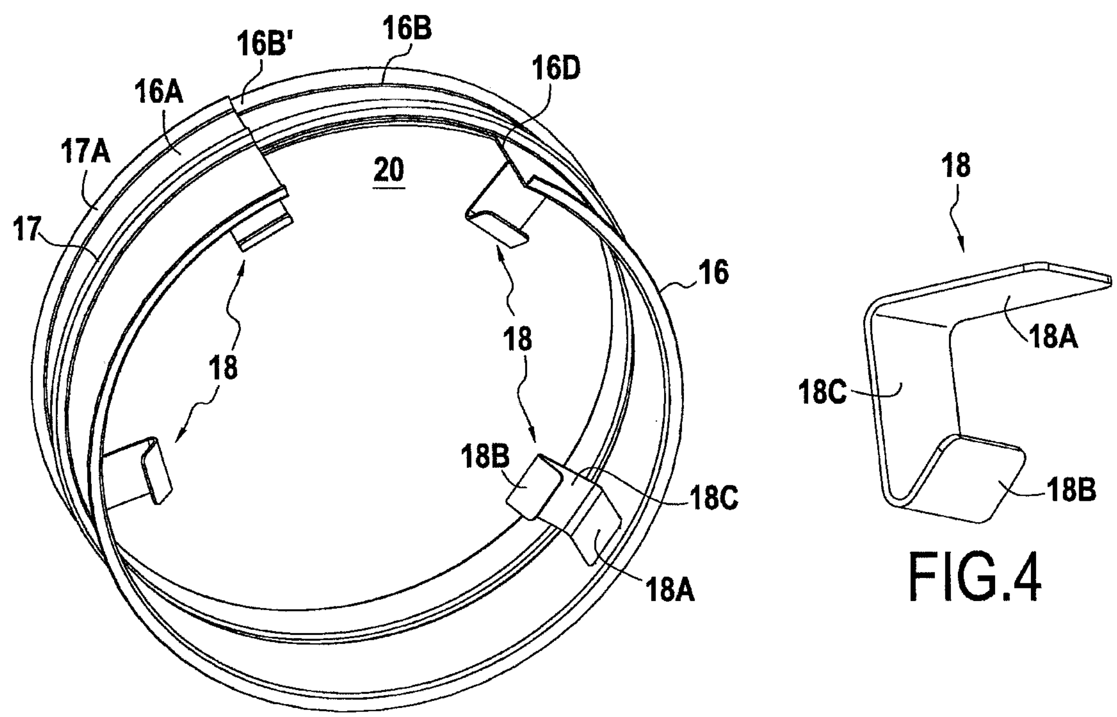
FIG.5
FIG.4

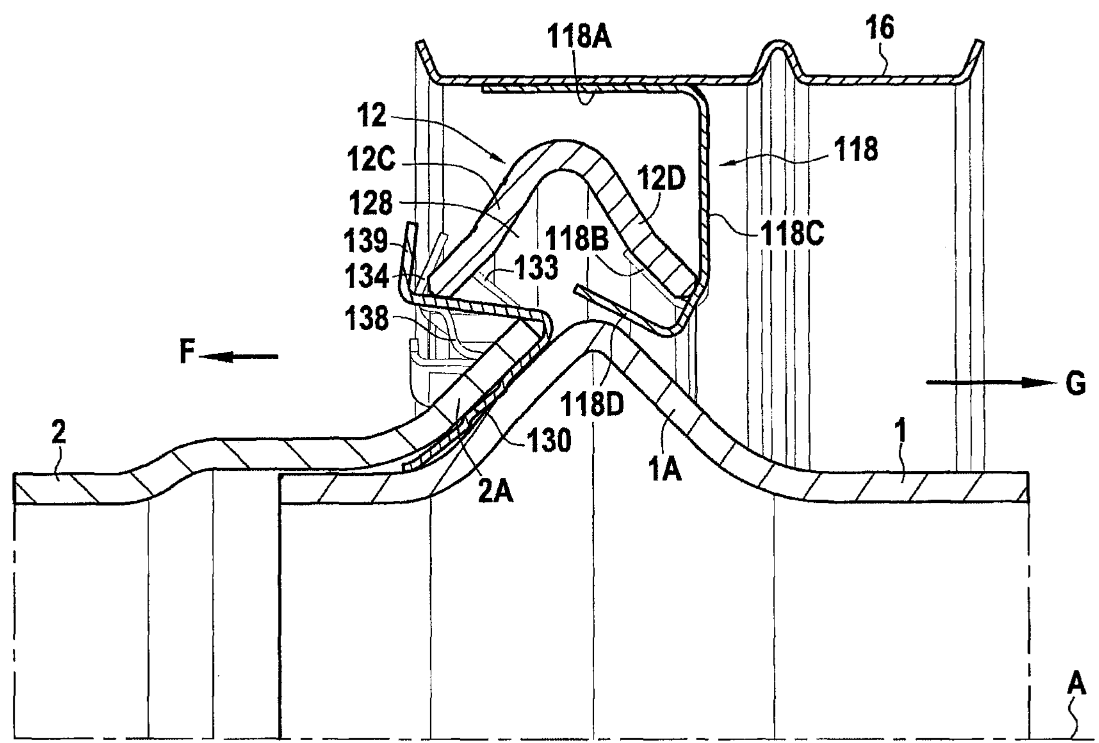
FIG.8
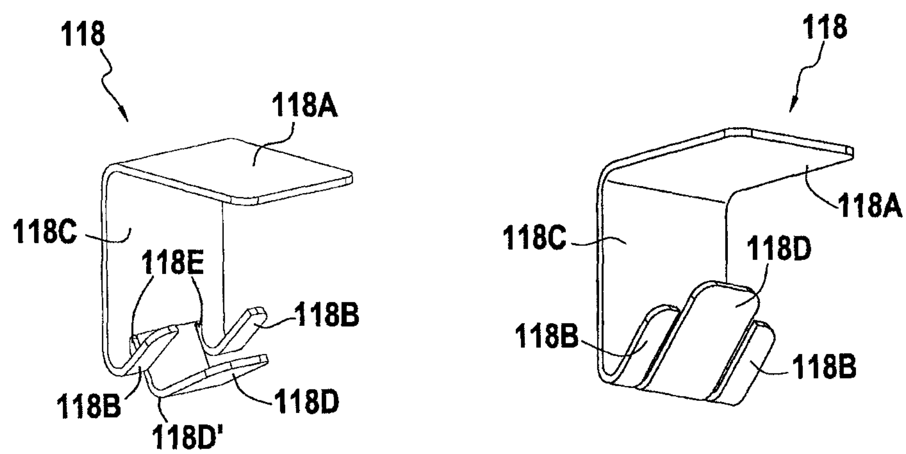
FIG.9
FIG.10

CLAMPING DEVICE COMPRISING A CLAMPING COLLAR AND A SLEEVE

CLAIM OF PRIORITY

This application claims priority from French Patent Application No. FR1653222, filed on Apr. 12, 2016 and is incorporated herein by reference in its entirety.

BACKGROUND OF THE DISCLOSURE

The present disclosure relates to a clamping device comprising a clamping collar having a belt suitable for being tightened around an article, and an outer sleeve disposed around the belt, said sleeve being carried by the belt by means of a plurality of fastener tabs.

By way of example, a device of this type is known from French patent no. 3 008 160, for the particular example in which the sleeve provides thermal protection to the collar area.

In particular, that device is installed in zones subjected to considerable stresses, in particular in terms of temperature gradient, vibration, or also of projections of external elements such as gravel or fluid. That is particularly true when the device is installed in the engine compartment or under the body of a vehicle.

Patent FR 3 008 160 proposes various solutions for fastening the sleeve to the belt of the collar. In particular, it proposes implementing said fastening by direct welding or clinching of the sleeve onto the collar, or also by clipping by means of clipping tabs, projecting from the sleeve and enclosing the collar. Those solutions give overall satisfaction, but there exists a need for the fastening of the sleeve relative to the collar to be made more secure, in particular in order to take into account the risks of a weld or clinching breaking, or indeed risks of untimely unclipping, e.g. under the effect of vibration or impacts, or indeed under the effect of thermal stresses (temperature variations can reach several hundreds of degrees in the engine compartment of a vehicle).

SUMMARY OF THE DISCLOSURE

Thus, the present disclosure aims to provide a solution that is even safer from the point of view of fastening the sleeve onto the clamping collar.

Thus, in one aspect, the present disclosure provides a clamping device comprising a clamping collar having a belt suitable for being tightened around an article, and an outer sleeve disposed around the belt, the sleeve being carried by the belt by means of a plurality of fastener tabs, in which device each fastener tab is fastened to the sleeve by a fastening zone and extends towards the axis of the collar from said fastening zone until it reaches a pinch branch that is folded back under the belt and is configured to be pinched between the inside surface of the belt and the article around which the belt is to be tightened.

Conventionally, provision could be made for three or four fastener tabs. However, it is possible to provide two of them, or more than four. The fastener tabs are fastened to the sleeve by the fastening zones.

As can be seen below, the sleeve may be of relatively large dimensions, particularly concerning its width, measured along the axis of the collar. Consequently, a satisfactory surface area is available for the fastening zones between the tabs and the sleeve. As a result, fastenings between the fastener tabs and the sleeve, e.g. made by welding or clinching, can be made on large areas and may therefore be subjected rarely to the risk of breaking.

The difficulty lies mainly in the fastening between the tabs and the collar, since this fastening must be made in an area of reduced size or on shapes that are more complex, because of the fact that the collar must primarily provide clamping around the article on which it is placed. In the present disclosure, fastening between the fastener tabs and the collar is provided by means of the pinch branches, which become pinched between the inside surface of the belt and the article around which the belt is to be tightened. Since the tightening forces are considerable, the pinching makes it possible to retain the pinch branches effectively and in very reliable manner under the collar, in such a manner that, when in use, and even in extreme conditions, in particular in terms of temperature gradient, vibration, or impacts, the branches remain well pinched for as long as the collar remains clamped, and that ensures that the sleeve is held in position around the collar.

Optionally, the pinch branch is suitable for being deformed under the effect of tightening the belt around the article.

Optionally, the pinch branch of each fastener tab extends over a length that is at least equal to 10%, preferably at least equal to 20%, of the width of the belt, measured in the direction of the axis of the collar.

In one aspect, the sleeve is rolled up over a roll-up diameter that, in a free state, i.e. when the sleeve is separated from the belt, is greater than the diameter of the sleeve when it is carried by the belt via the fastener tabs.

By way of example, the sleeve is of the open type, i.e. it is rolled up from its first end until reaching its second end, and said ends are not fastened to each other. In this configuration, in order to put it into place on the collar, it is easy to compress it radially in order to reduce its diameter so that the pinch branches can penetrate under the belt of the collar, and then merely to release the radial pressure exerted on the sleeve so that the pinch branches are retained under the belt of the collar as a result of the tendency of the sleeve to return elastically to its free-state diameter.

Optionally, the fastener tabs are all situated on a same side of the belt.

In this configuration, and by way of example, the pinch branches of the various tabs may be brought under the belt of the collar merely by moving the sleeve in translation parallel to the axis of the collar while the sleeve is compressed radially so that its branches can pass under the belt.

In one aspect, each fastener tab presents a spacer portion between the fastening zone and the pinch branch, which spacer portion is spaced apart from the belt and defines an empty space between the belt and the sleeve.

The spacer portion holds the sleeve at a radial distance from the belt of the collar, which, in some circumstances, may be favorable for the function performed by the sleeve. By way of example, by means of the spacer portion, the sleeve is not in contact with the belt of the collar and it is even relatively far away therefrom, in such a manner that, if the sleeve is used for thermal protection, heat is not conveyed by conduction between the sleeve and the collar. In another example, the sleeve may be used to protect against gravel or impacts, being held at a distance that makes it possible, even if the sleeve is slightly deformed by a relatively strong impact, for the deformation to be absorbed in the above-mentioned empty space, without affecting the collar.

Optionally, the spacer portion extends substantially perpendicularly to the axis of the collar.

This makes it possible to limit the area of contact between the fastener tabs and the collar. In fact, the contact zone corresponds to the pinch branch, but the fastener tab moves away from the collar as soon as the pinch branch and the spacer portion are joined together.

In one aspect, the belt presents first and second flanks between which there is defined an inner trough suitable for receiving a widening of the article that is to be clamped by the collar, each of said flanks sloping relative to the axis of the collar.

By way of example, the collar may serve to clamp an article constituted by two analogous tubes connected to each other via their respective ends that form the above-mentioned widening, which widening is housed in the inner trough of the belt of the collar. This is described in patent no. FR 3 008 160, for example.

Optionally, the pinch branches of the fastener tabs co-operate with the same flank and extend substantially parallel to said flank.

Optionally, at least one of the fastener tabs is a fastener and retainer tab that presents at least one retainer branch, which, in a free state, is offset towards the axis of the collar relative to the pinch branch.

As can be seen below, the retainer branch may be used to hold the widening of the article that is to be clamped inside the belt in a pre-attachment situation, before tightening the collar. The term "in a free state" means a state in which the fastener and retainer tab has not yet been subjected to the tightening stresses of the collar on the article. In particular, it is the state in which the sleeve is fastened to the collar by the fastener tabs, without the collar being tightened.

Optionally, the retainer branch and the pinch branch are both formed at the free end of the fastener and retainer tab opposite its fastening zone, and they are separated by a cut-out.

In one aspect, the collar presents tightening lugs projecting radially relative to the belt, and the sleeve presents a window beyond which the tightening lugs extend.

It is thus easy to access the tightening lugs in order to tighten the collar while the sleeve is in place thereon.

In one aspect, the sleeve presents a first end situated in the vicinity of one of the tightening lugs and a second end that includes the window and that has a free end that co-operates with the first end.

In one aspect, the sleeve presents at least one circumferential rib.

The circumferential rib makes it possible to strengthen the sleeve, i.e. to stiffen it in the circumferential direction in order to encourage its tendency to return elastically towards its free-state diameter.

Optionally, the circumferential rib extends from the first end until it reaches the free end, and forms a projection on a first face of the sleeve and a hollow in the opposite second face, and the free end and the first end cover each other, the projection formed by the rib on the first face of one of the elements constituted by the free end and the first end penetrating into the hollow formed by the rib in the second face of the other of said elements.

This shaping makes it possible to guide the free end and the first end relative to each other when the diameter of the sleeve is reduced during tightening of the collar, and serves to ensure that these two elements are properly positioned relative to each other.

BRIEF DESCRIPTION OF THE DRAWINGS

The disclosure can be well understood on reading the following detailed description of embodiments shown by way of non-limiting example. The description refers to the accompanying drawings, in which:

FIG. 3 is a section view on the section plane III of FIG. 2;

FIG. 4 is a perspective view of a fastener tab;

FIG. 5 is a perspective view of a single sleeve carrying fastener tabs;

FIG. 8 is a section view on the section plane VIII of FIG. 7; and

FIGS. 9 and 10 are perspective views of fastener tabs in a variant embodiment, respectively before and after tightening the collar.

DETAILED DESCRIPTION OF THE DISCLOSURE

Figure 1:
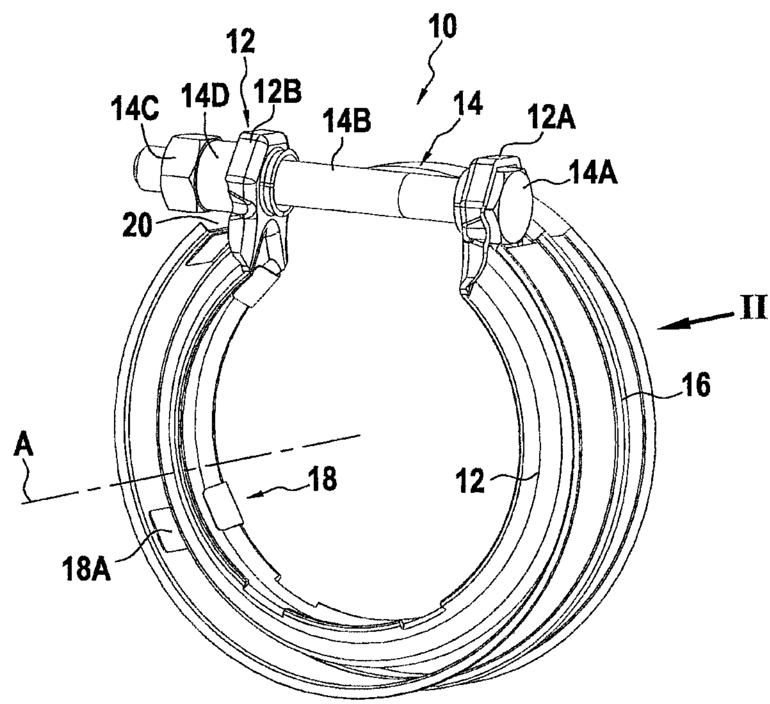
FIG. 1 is a perspective view of a device of the present disclosure.

FIG. 1 shows a clamping device comprising a clamping collar 10 with a belt 12 having radially upstanding tightening lugs, respectively 12A and 12B. These lugs are provided with holes through which the rod 14B of a tightening bolt 14 passes, the head 14A of said bolt bears against the lug 12A and it can be tightened against the lug 12B by a nut 14C. In addition, in order to straighten the tightening force and to promote the quality of tightening, a spacer 14D may be disposed between the nut 14C and the lug 12B.

The clamping device also comprises an outer sleeve 16 that is carried by the collar, being disposed around the belt 12. In particular when considering FIGS. 1 to 3, it should be understood that the sleeve surrounds the belt 12 of the collar, possibly even extending axially over a width LM that is greater than the width LC of the belt, said widths being measured parallel to the axis A of the collar. The sleeve may project axially from one side of the belt, or indeed from both sides of said belt. In addition, the sleeve may surround the belt in part only, extending over an angular range that is less than 360°.

The sleeve is carried by the belt by means of a plurality of fastener tabs 18. In this example, four fastener tabs are shown. Each fastener tab is fastened to the sleeve by a fastening zone 18A and extends towards the axis A of the collar from said fastening zone, until it reaches a pinch branch 18B that is folded under the belt 12, as can be seen in particular in FIGS. 1 and 3.

In the meaning of the present invention, it is considered that the inward direction is the direction that goes radially towards the axis A of the collar. In addition, stating that the pinch branch is folded under the belt means that said branch is on the inside of the collar, i.e. between the belt and the axis A. In general, when it is stated that an element is positioned under another element, that means that it lies between said other element and the axis A.

In addition, the fastener tab 18 presents a spacer portion 18C that extends between the fastening zone 18A and the pinch branch 18B. As shown in particular in FIG. 3, the spacer portion defines an empty space E between the belt 12 and the sleeve 16. In this example, the fastener tabs are fastened under the sleeve, the fastening zones 18A co-operating with the inside face of the sleeve. As indicated above, the sleeve may present a relatively large width LM, measured axially. Thus, the zones of contact between the fastening zone 18A of the fastener tabs and the inside face of the sleeve may be relatively large, which makes strong fastening possible. In particular, the fastening zones may be fastened to the sleeve by welding or by clinching over relatively large areas, e.g. of the order of 1 cm2. This makes it possible to ensure extremely strong fastening between the fastener tabs and the sleeve, the fastening rarely being subjected to breaking, even under the effect of vibration, variations in temperature, or high impacts.

In the example shown, the belt 12 of the collar is of the type presenting an inside trough suitable for receiving a widening of the article that is to be clamped by means of the collar. More precisely, as can be seen in FIG. 3, the belt 12 presents a first flank 12C and a second flank 12D between which a trough is defined. By way of example, the collar is of the same type as that described in European patent nos. 1 451 498 and 2 598 785. In this example, the article that is to be clamped by means of a collar is formed by two tubes that are connected together, i.e. a first tube 1 presenting a flared portion defining a first clamping surface 1A and a second tube 2 also presenting a flared portion defining a second clamping surface 2A. In order to connect the tubes together, the two clamping surfaces 1A and 2A are moved towards each other and thus form a widening of the article that is to be clamped, said widening being received in the trough of the belt. In fact, the tube 1A presents an end skirt 1B that extends from the top of the flared portion forming the first clamping surface 1A towards the free end of said first tube, by moving closer to the axis A. Thus, the inside face of the flared portion forming the clamping surface 2A is situated above said skirt 1B when the two tubes are assembled.

Specifically, the device shown includes a pre-attachment washer of the type described in European patent no. 2 598 785 the content of which is incorporated herein. In the present disclosure, said washer is described only briefly. For more detail, the above-mentioned patent may be consulted. The washer 28 is secured to the collar and presents both a frustoconical annular portion 30 disposed between the skirt 1B and the inside surface of the flared portion forming the clamping surface 2A, and tabs that serve to retain the washer relative to the belt and also to retain the assembled ends of the tubes 1 and 2 under the belt 12, before clamping the collar, in the pre-attachment situation. In particular, the washer may present inside tabs for bearing on the inside surface of the flank 12C of the belt (these tabs are not shown), and outside tabs 34 that are folded over outside the flank 12C and may present tongues 38 having free ends that bear on the clamping surface 2A in order to hold the second tube against moving relative to the belt in the direction F. The washer 28 further presents tabs 40 that, from the frustoconical portion 30, depart slightly from the axis A in order to pass over the top of the clamping surface 1A, approaching the axis A in order to present a fold 40A retaining the clamping surface 1A in the pre-attachment situation, then once again departing from the axis to be folded over the outside of the flank 12D so as to be held relative to the belt.

Figure 2:
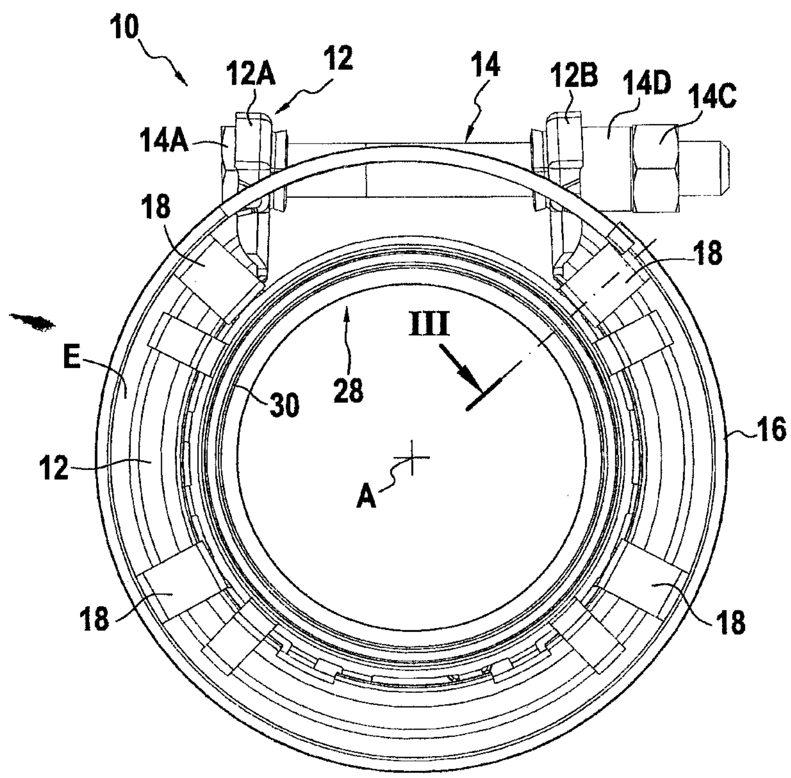
FIG. 2 is a side view of the device of FIG. 1, taken looking along arrow II of FIG. 1.
Figure 6:
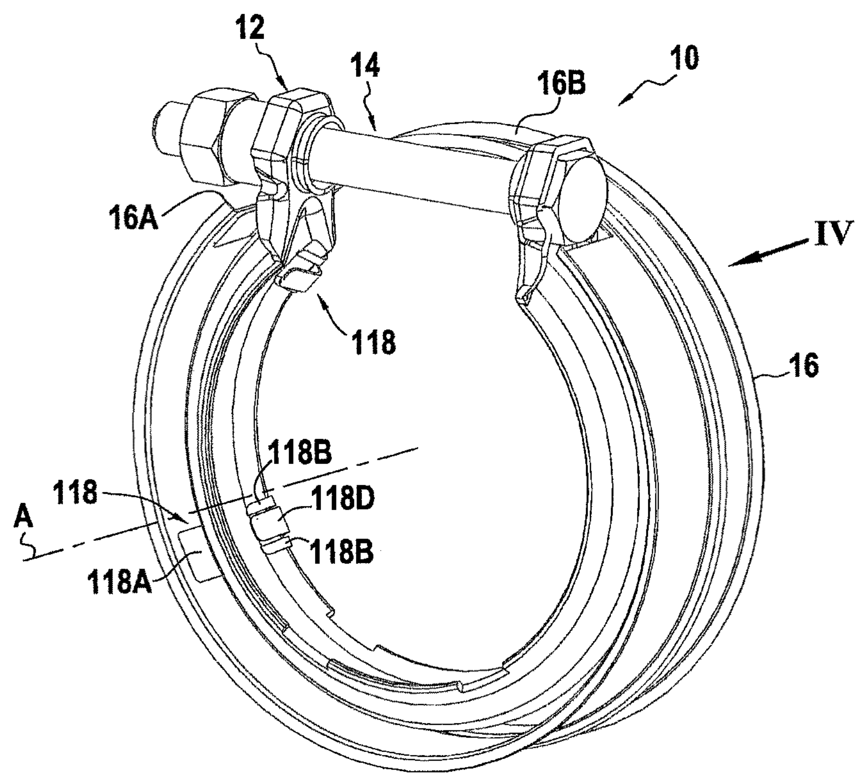
FIG. 6 is a view analogous to the FIG. 1 view, but showing a variant embodiment.
Figure 7:
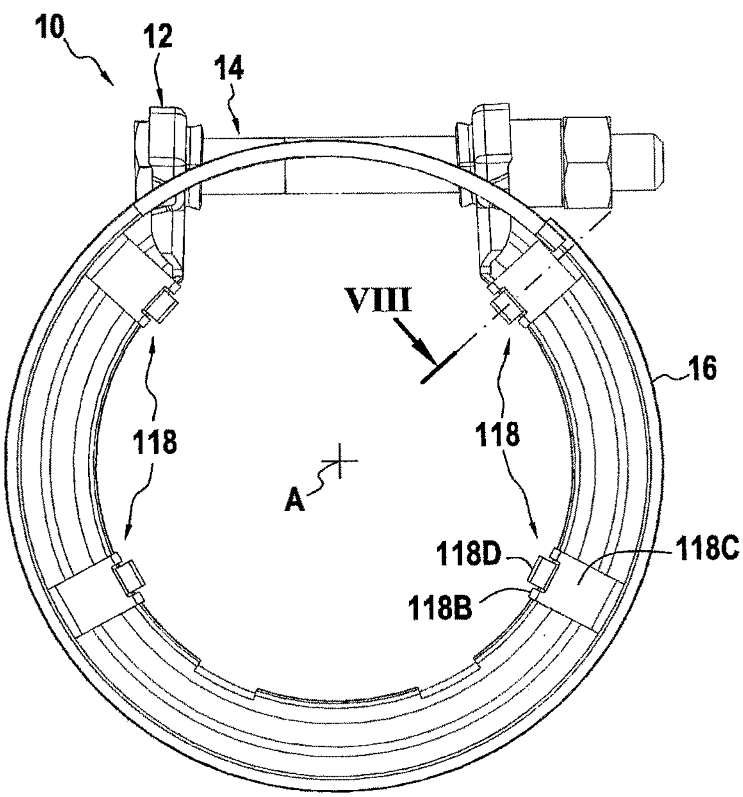
FIG. 7 is a side view seen looking along arrow V of FIG. 6.

It should be observed that the sleeve with the clamping tabs 18 is completely compatible with the presence of such a pre-attachment washer. In particular, as can be seen in FIG. 2, the tabs 18 do not interfere with the tabs 40 since they are situated circumferentially between said tabs 40.

However, it should be understood that the sleeve of the present disclosure may be provided on a collar that does not have an inner washer, and even on a collar that does not have an inner trough.

The collar and the protection sleeve may be made of metal, e.g. of stainless steel. As can be seen in FIG. 3, the belt of the collar may be relatively thick in order to be capable of exerting the required tightening force. In contrast, the washer 28 is deformable (i.e. significantly more easily deformable than the belt). It can be seen that its thickness is less than that of the belt. In particular, the washer is made in a strip of metal that is thinner than the belt.

FIG. 3 shows that the same applies to the tightening tabs 18, which in particular may be made of the same material as the washer and have the same thickness. By way of example, the thickness e18 of the tabs 18 may lie in the range 10% to 40% of the thickness e12 of the belt. Thus, the fastener tabs 18 may be easily deformed.

This is particularly advantageous with regard to their pinch branches 18B. Although FIG. 3 shows the pinch branch 18B pressed against the inside face of the flank 12D of the belt before tightening the collar, this needs not be so. The pinch branch may initially have a slope relative to the axis A that is different to the slope of the flank 12D, e.g. sloping less than the flank 12D. However, during tightening of the collar, the pinch branch deforms like the washer 28 to adopt the shape of the inside surface of the belt and does not impede tightening.

FIG. 3 shows that the pinch branch 18B of the fastener tab 18 extends over a length L18B, measured parallel to the axis A of the collar, which is of the order of 30% of the width LC of the belt, also measured in the direction of the axis of the collar. In particular, the length L18B may be at least equal to 10%, or even at least equal to 20% of the width LC. This ensures pinching over a length that is sufficient for effectively and efficiently retaining the tab under the collar. In addition, it is possible for the pinch branch to extend as far as the flank 12C.

The sleeve 16 is rolled up over a roll-up diameter DE. FIG. 5 shows the sleeve in a free state, in which said diameter DE is slightly greater than the diameter of the sleeve when it is carried by the belt, even before tightening of the collar. In addition, FIGS. 1 to 3 show that the fastener tabs 18 are all situated on a same side of the belt 12. When the sleeve is considered alone, not attached to the collar, the fastener tabs 18 are then all situated in a same radial edge face of the sleeve, as shown in FIG. 5. In addition, FIG. 5 also shows that the sleeve is rolled up between a first end 16A and a second end 16B, formed specifically on the edge of a window 20 beyond which the tightening lugs 12A and 12B extend. In particular, FIG. 1 shows that the first end 16A of the sleeve, in the attached state, is situated on the same side as the lug 12B. The free end 16B' of the second end of the sleeve co-operates in relative sliding with the first end 16A. Thus, relative to its diameter in a free state, the diameter of the sleeve can be reduced merely by radial compression.

In this embodiment it should be observed that the second end 16B of the sleeve forms specifically a tongue that circumferentially borders the window 20. This makes it possible for the sleeve to extend beyond the article to be clamped, the above-mentioned tongue being axially beside the means for tightening the collar.

Naturally, even if the examples show a single tongue on a single circumferential edge of the window, it should be understood that there could be two tongues on each of the two circumferential edges of the window, in particular if the sleeve is extended axially in the direction F that is shown in FIG. 3, in such a manner as to extend further over the tube 2, as described in patent FR 3 008 160.

However, the second end of the sleeve may also be analogous to the first end, and may axially border the window 20, in which configuration the cutout line 16D shown in FIG. 5 would extend over the entire width of the sleeve.

In any one of the above-mentioned possibilities, it is possible to reduce the diameter of the sleeve by using radial compression. In addition, it can be seen that, in a free state, the pinch branches are bent into hooks that are slightly raised so that their free ends depart from the axis of the collar. Thus, in order to put the sleeve into place on the collar before tightening the collar, it suffices to compress the sleeve radially until its diameter is reduced in such a manner that the free ends of the pinch branches together define a diameter that is smaller than the diameter of the inside edge of the flank 12D of the belt, and then to move the sleeve axially until the pinch branches are inserted under the belt, and then merely to release the radial stress exerted on the sleeve in such a manner that it returns elastically to the dimensions that press the pinch branches against the inside face of the belt. Thus, when the sleeve is in place, the fastener tabs 18 co-operate with the same flank 12D of the belt and the pinch branches extend substantially parallel to said flank.

It can further be seen, in particular in FIGS. 3 and 5, that the sleeve 16 presents a circumferential rib 17. By way of example, this rib is formed by a boss that extends along the circumference of the sleeve, in a radial edge face. The rib can serve to stiffen the sleeve in such a manner as to give it the desired properties for elastic return towards its free-state diameter.

In addition, the circumferential rib 17 extends specifically from the first end 16A of the sleeve until it reaches the free end 16B'. It forms a projection on the outside face of the sleeve, and a hollow on its inside face. The free end 16B' and the first end 16A overlap each other. Specifically, it should be understood that the free end 16B' extends inside the first end 16A. In this configuration, the projection formed by the rib 17 on the outside face of the free end penetrates into the hollow that it forms on the inside face of the first end 16A. The rib can be said to provide guidance between the free end and the first end 16A when the diameter of the sleeve is modified, in particular when said sleeve is put into place and during tightening of the collar. This also makes it possible to wedge the tongue formed at the second end 16B axially relative to the first end 16A in order to ensure good axial strength of the sleeve.

Naturally, the shape could be inverted, by making the rib in such a manner that the hollow is in the outside face. Provision could also be made for a plurality of ribs of the above-mentioned type. In addition, it should be observed that the axial edges 17A and 17B of the sleeve are outwardly raised a little. The axial edge 17A as raised in this way at the second end 16B thus engages under the axial edge 17A at the first end 16A and also contributes to the respective axial wedging of the two ends of the sleeve.

A variant embodiment is described below with reference to FIGS. 6 to 10. In this variant, the collar and the sleeve are identical to those in the above-described figures, and are therefore designated by the same references. In contrast, it should be observed that the washer 28 is absent. In this variant, the fastener tabs for fastening the sleeve on the collar also serve to ensure pre-attachment of the tubes to the collar before tightening. Specifically, the fastener tabs 118 are analogous to the above-mentioned tabs 18 in that they include a fastening zone 118A, a pinch branch 118B, and a spacer portion 118C. The fastener tabs thus have the same overall shape as the tabs 18, the spacer portion specifically being oriented substantially radially. However, in this variant, the fastener tabs 118 are fastener and retainer tabs. Thus, in addition to the pinch branch 118B, they present a retainer branch 118D that is offset towards the axis of the collar relative to the pinch branch. As can be seen in FIG. 8, the retainer branch 118D thus extends further towards the axis of the collar than the pinch branch 118B, in a free state, i.e. before tightening the collar and deforming said branches under the effect of that tightening. Said retainer branch defines a minimum distance relative to the axis of the collar that is less than the diameter of the top of the clamping surface 1A of the tube 1. Thus, when the tube 1 is being put into place under the collar, the top of the clamping surface 1A causes the retainer branch to flex outwards in such a manner as to pass under said branch, then the retainer branch elastically returns to its rest position shown in FIG. 8. Thus, it opposes withdrawal of the tube 1 from the collar in direction G shown in FIG. 8, before tightening the collar.

It should be observed that the clamping device may also be fitted with pre-attachment means for the tube 2 opposing its withdrawal in direction F. FIG. 8 shows a washer 128 that is generally analogous to that disclosed in European patent no. 1 451 498. In this description, said washer is described concisely. It presents a frustoconical portion 130 situated between the tubes 1 and 2, inside tabs 133 bearing against the inside face of the flank 12C of the belt 12, outside tabs 134 co-operating with the edge of said flank 12C on the outside, with tongues 138 bearing against the clamping surface 2A of the tube 2. In addition, said washer presents outside tabs 139 that are substantially axial, having their free ends folded outwards. Said washer 130 is secured to the belt of the collar and thus serves to retain the second tube 2 in the pre-attached state inside the collar. Thus, the two tubes can be connected inside the clamping device before tightening of the collar.

In particular, FIGS. 9 and 10 show that the retainer branch 118D and the pinch branch 118B are both formed at the free end of the tab 118 opposite its fastening zone 118A. They are separated from each other by a cutout portion 118E. Thus, the end portion of the tab 118 needs only comprise a retainer branch and a pinch branch. However, In the example shown, the retainer branch 118D is disposed between two pinch branches 118B, in such a manner that two cutout portions situated on either side of the retainer branch 118D are formed.

In a free state, as shown in FIGS. 8 and 9, the retainer branch extends further towards the axis of the collar than the pinch branches in such a manner as to perform the above-mentioned pre-attachment. In particular, they thus present a folding zone 118D' close to the axis and situated under the flank 12D of the collar. As described above, the fastener tabs are deformable. FIG. 10 shows the appearance of the tab 118 after tightening the collar, and it can be seen in that figure that the retainer branch 118D has been returned to the same plane as the pinch branch(s) 118B by being, like the branches, pinched between the inside periphery of the collar and the article clamped by the collar.

The invention claimed is:

1. A clamping device comprising a clamping collar having a belt suitable for being tightened around an article, wherein said belt has an outer surface, and edge and an inner surface and an outer sleeve disposed around the belt, said sleeve being carried by the belt by means of a plurality of fastener tabs, each fastener tab being fastened to the sleeve by a fastening zone and extending towards the axis of the collar from said fastening zone until it reaches a pinch branch, which is folded back under the belt and is configured to extend past said edge of said belt and extend along said inner surface of said belt and is pinched between the inside surface of the belt and the article around which the belt is to be tightened.

2. A device according to claim 1, wherein the pinch branch is suitable for being deformed under the effect of tightening the belt around the article.

3. A device according to claim 1, wherein the pinch branch of each fastener tab extends over a length that is at least equal to 10% of a width of the belt, measured in the direction of the axis of the collar.

4. A device according to claim 1, wherein the pinch branch of each fastener tab extends over a length that is at least equal to 20% of a width of the belt, measured in the direction of the axis of the collar.

5. A device according to claim 1, wherein the sleeve is rolled up over a roll-up diameter that, in a free state, i.e. when the sleeve is separated from the belt, is greater than the diameter of the sleeve when it is carried by the belt via the fastener tabs.

6. A device according to claim 1, wherein the fastener tabs are all situated on a same side of the belt.

7. A device according to claim 1, wherein each fastener tab presents a spacer portion between the fastening zone and the pinch branch, which spacer portion is spaced apart from the belt and defines an empty space between the belt and the sleeve.

8. A device according to claim 7, wherein the spacer portion extends substantially perpendicularly to the axis of the collar.

9. A device according to claim 1, wherein the belt presents first and second flanks between which there is defined an inner trough suitable for receiving a widening of the article that is to be clamped by the collar, each of said flanks sloping relative to the axis of the collar.

10. A device according to claim 9, wherein the pinch branches of the fastener tabs co-operate with the same flank and extend substantially parallel to said flank.

11. A device according to claim 9, wherein at least one of the fastener tabs is a fastener and retainer tab that presents at least one retainer branch, which, in a free state, is offset towards the axis of the collar relative to the pinch branch.

12. A device according to claim 11, wherein the retainer branch and the pinch branch are both formed at the free end of the fastener and retainer tab opposite the fastening zone thereof, and are separated by a cut-out.

13. A device according to claim 1, wherein the collar presents tightening lugs projecting radially relative to the belt, and the sleeve presents a window beyond which the tightening lugs extend.

14. A device according to claim 13, wherein the sleeve presents a first end situated in the vicinity of one of the tightening lugs and a second end that includes the window and that has a free end that co-operates with the first end.

15. A device according to claim 1, wherein the sleeve presents at least one circumferential rib.

16. A device according to claim 14, wherein the sleeve presents at least one circumferential rib which extends from the first end until it reaches the free end and which forms a projection on a first face of the sleeve and a hollow in the opposite second face, and wherein the free end and the first end cover each other, the projection formed by the rib on the first face of one of the elements constituted by the free end and the first end penetrating into the hollow formed by the rib in the second face of the other of said elements.

17. A clamping device comprising a clamping collar having a belt suitable for being tightened around an article, wherein said belt has an outer surface, an edge and an inner surface and an outer sleeve disposed around the belt, said belt presents first and second flanks between which there is defined an inner trough suitable for receiving a widening of the article that is to be clamped by the collar, each of said flanks sloping relative to the axis of the collar, said sleeve being carried by the belt by means of a plurality of fastener tabs, each fastener tab being fastened to the sleeve by a fastening zone and extending towards the axis of the collar from said fastening zone until it reaches a pinch branch which is folded back under the belt and is configured to extend past said edge of said belt and extends along an inner surface of one of said first and second flanks and is pinched between the inside surface of the belt and the article around which the belt is to be tightened.

18. A clamping device comprising a clamping collar having a belt suitable for being tightened around an article, and an outer sleeve disposed around the belt, said sleeve being carried by the belt by means of a plurality of fastener tabs, each fastener tab being fastened to the sleeve by a fastening zone and extending towards the axis of the collar from said fastening zone until it reaches a pinch branch, which is folded back under the belt and is configured to be pinched between the inside surface of the belt and the article around which the belt is to be tightened;

wherein the belt presents first and second flanks between which there is defined an inner trough suitable for receiving a widening of the article that is to be clamped by the collar, each of said flanks sloping relative to the axis of the collar; and wherein the pinch branches of the fastener tabs co-operate with the same flank and extend substantially parallel to said flank.

* * * * *